Jan. 25, 1966  C. S. BATCHELOR ETAL  3,231,058
FRICTION DEVICE

Filed Feb. 19, 1962  2 Sheets-Sheet 1

INVENTORS
CLYDE S. BATCHELOR
BY WARREN R. JENSEN
Gary, Desmond & Parker
ATTYS.

Jan. 25, 1966  C. S. BATCHELOR ETAL  3,231,058
FRICTION DEVICE
Filed Feb. 19, 1962  2 Sheets-Sheet 2

INVENTORS
CLYDE S. BATCHELOR
WARREN R. JENSEN
by: Gary, Parker, Juettner & Cullinan
ATTYS.

United States Patent Office 3,231,058
Patented Jan. 25, 1966

3,231,058
FRICTION DEVICE
Clyde S. Batchelor, Trumbull, and Warren R. Jensen, Stratford, Conn., assignors to Raybestos-Manhattan, Inc., Passaic, N.J., a corporation of New Jersey
Filed Feb. 19, 1962, Ser. No. 173,942
2 Claims. (Cl. 192—107)

This invention relates to improvements in friction elements of the annular disc type for use as one of the mutually engaging parts in friction couples employed for power transmission purposes, i.e., clutches, or for motion retarding or arresting purposes, i.e., brakes.

The device of the present invention is particularly adapted for use as a friction clutch element in industrial devices such as paper winders where torque increases as the size of the paper roll increases and where greater tension is required as the size of the roll increases; with the reverse being true in unwinding where the size of the paper roll progressively decreases. Operations of such nature require low clutch or brake plate pressures, such as from about 1 to about 25 pounds per square inch, since torque is there regulated by pressure.

The friction material composition lining employed, which is substantially of a nonmetallic and heat-insulating character, although heat-hardened, is still surface vulnerable to high frictional heat and is difficult to provide with a smooth surface due to its heterogeneous composition. As is well known, conventional friction composition lining materials are composed of mixtures of fibrous materials such as asbestos and others which may be cellulose; friction material fillers such as friction augmenting and modifying agents or purely inert materials; and a heat-curable or thermosetting organic binder such as conventional or oil-modified phenol-aldehyde resins, epoxy resins, polyester resins, drying oils, natural or synthetic rubbers, and their mixtures.

Such heat hardened materials are generally possessed of some residual distortability which gives them a desirable character of "toughness" rather than a flinty or brittle character, and it is practically unfeasible to provide or maintain their operative faces free of irregularities even when supported on rigid metal backing plates.

Although the friction element of the present invention is adapted for use in conventional air cooled equipment, it desirably is employed in combination with known, hollow liquid-cooled metallic elements having high heat conductivity facings generally and principally composed of copper such as for example shown in the Jensen and Lacroix U.S. Patent No. 2,940,556, and others. These metallic liquid-cooled facings are also possessed of a degree of softness and sensitivity to generated frictional heat, particularly at the friction interface, which results in high local wear and distortion when the degree of area contact between the metal and nonmetal facings at the indicated low operative pressures is poor.

Even though the mating parts, both metal and friction composition lining, are of a substantially rigid nature and have been machined to give them smooth surfaces, inherent mechanical and other difficulties in obtaining uniform surface contact throughout the mating surfaces exist in commercial construction and operation. Thus in a mating friction disc couple as set up ready for initial operation there is small contact. Some of the factors producing this are that the mating members do not engage on a common plane. This is caused by run-out of either mating face or can be caused by the linings not being of uniform thickness at all points (lack parallelism). The linings also being heterogeneous may not machine to a plane surface. Cumulatively, there are many factors which assure that initial contact of new surfaces will be very small.

Resilience and flexibility of the friction lining material and assembly will usually bring about sufficient contact when the pressure is over 25 pounds per square inch, but as the pressure is progressively lowered, the problem of limited contact becomes acute, and is particularly serious in liquid cooled devices which rely on contact for rapid heat flow through the highly heat conductive member.

These manufacturing difficulties are in turn aggravated by the use to which the aforementioned friction devices are put. Where low application pressures of up to 25 pounds per square inch are used with rotational speeds in excess of 500 r.p.m., the heat generated in the metallic member of the friction couple is not uniform and is sufficient to cause local hot spots in the friction track. These hot spots are highly stressed areas which relieve themselves by forming waves or protuberances normal to the friction track. The formation of these protuberances forces the lining away from the greater portion of the friction track and the total force and frictional heat is concentrated on these few hot spots causing rapid wear on the lining and, in many cases, cracks and scoring in the metal member. As is evident, this becomes an ever-changing cycle since the appearance of the protuberances in one spot causes the temperature to start changing in all parts of the friction track, some areas of temperature rise and others of temperature falling, all of which cause new areas of high stress with new protuberances being constantly formed in a random pattern throughout the friction track; their appearance always heralded by severe localized wear on the lining and scoring with local cracking in the metallic member.

This phenomena of transient or fugitive contact also manifests itself in torque variations, for as areas of contact wander back and forth across the friction track, the effective torque arm also varies across the friction track causing the torque output of the device to vary unreasonably. The net result of these manufacturing and operational difficulties when operating at pressures lower than 25 pounds per square inch may result in only approximately 5% contact that is moving constantly over the friction track from protuberance formation to protuberance formation with unreasonably high wear rates on the lining and scoring and cracking occurring in the metal members for the energy involved.

For example, we have found that at pressures such as 5 pounds per square inch on the friction lining that wear is castastrophic even at low energy absorption. Fugitive contact can be sensed by watching the erratic action of the clutch in operation and occasionally seeing a red glow at the periphery as a contact point occurs near the edge. This type of failure is characterized by very rapid wear and freshly abraded metal may commonly be seen as well as contact points in various stages of decay.

To conclusively portray the problem, it is a fact that a clutch operating with continuously applied pressure of 3 pounds per square inch failed quickly by wearing out. The same clutch when operated with a continuous pressure of 30 pounds per square inch or at about 10× the output was more stable and wore very little. In this example, the increased pressure produced additional contact in sufficient amount to more than overcome the resulting tenfold increase in input. This phenomenon proves conclusively how small the contact really is at low pressure.

It is therefore the object of the present invention to mount the friction composition lining material on a metal mounting plate with a layer of resilient material interposed between them so as to fully cushion the friction material throughout its area, to thereby compensate for surface inequalities and provide enhanced contact with the surface of the mating element in the brake or clutch, and to thus result in low wear of both the friction composition and the adjacent metal facing against which it is operatively pressed.

The objects and advantages of the present invention, and its arrangement of parts and economies will be further apparent from a consideration of the following specification and accompanying drawings, wherein.

Figure 1:
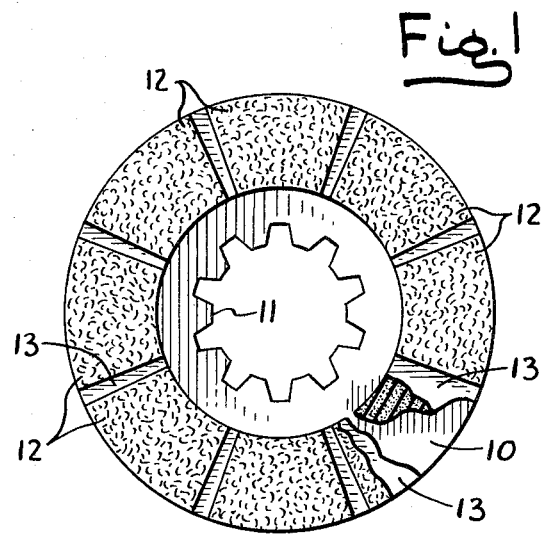
FIG. 1 is a face view, with parts broken away, of one specific and preferred embodiment of the friction unit of the present invention.
Figure 2:
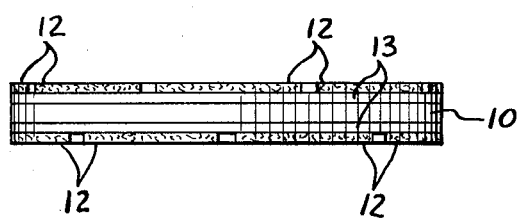
FIG. 2 is an edge view thereof.

Referring to the drawing, the reference numeral 10 indicates a steel core or backing plate, which for illustration purposes and when used as a clutch plate is provided with peripheral outer or inner splines 11, as conventional. Overlying one, or as shown both faces of plate 10 is the essentially nonmetallic friction composition lining material 12 in the form of spaced radial segments arranged to form a substantially annular disc.

Disposed and adhesively bonded between the plate 10 and the friction material 12 is the resilient material layer 13 fully supporting the friction material elements 12 throughout their entire areas so as to provide them with full and uniform cushioning.

This cushioning material layer 13 is preferably composed of sponge rubber up to ⅛ inch in thickness and of medium hard character that will be deformable up to 25 pounds per square inch since such resilient backing is of primary utility herein with pressures insufficient to fully collapse the sponge rubber. This sponge rubber support increases the area of effective contact and thus low wear of both the metallic and nonmetallic mating surfaces.

Although division of the friction lining 12 into a plurality of segments, as shown, enhances the desirable cushioning effect described, similar results can be obtained on friction linings of nominal thickness (say 3/16 inch) by providing a one-piece annular lining with deep radial grooves which provide sufficient articulation to be aligning. With very thin friction linings segmenting or grooving is not required due to adequate inherent flexibility.

Although not fully equivalent, after complete collapse there is some residual advantage in that the sponge rubber has flowed and helped to fill out hollows, and flows away from thick spots.

As a nonfully equivalent alternative to the sponge rubber, perforated solid rubber can be employed; and as another nonfully equivalent alternative a plurality of spaced small springs disposed over the area of the friction elements 12 can also be employed.

Figure 3:
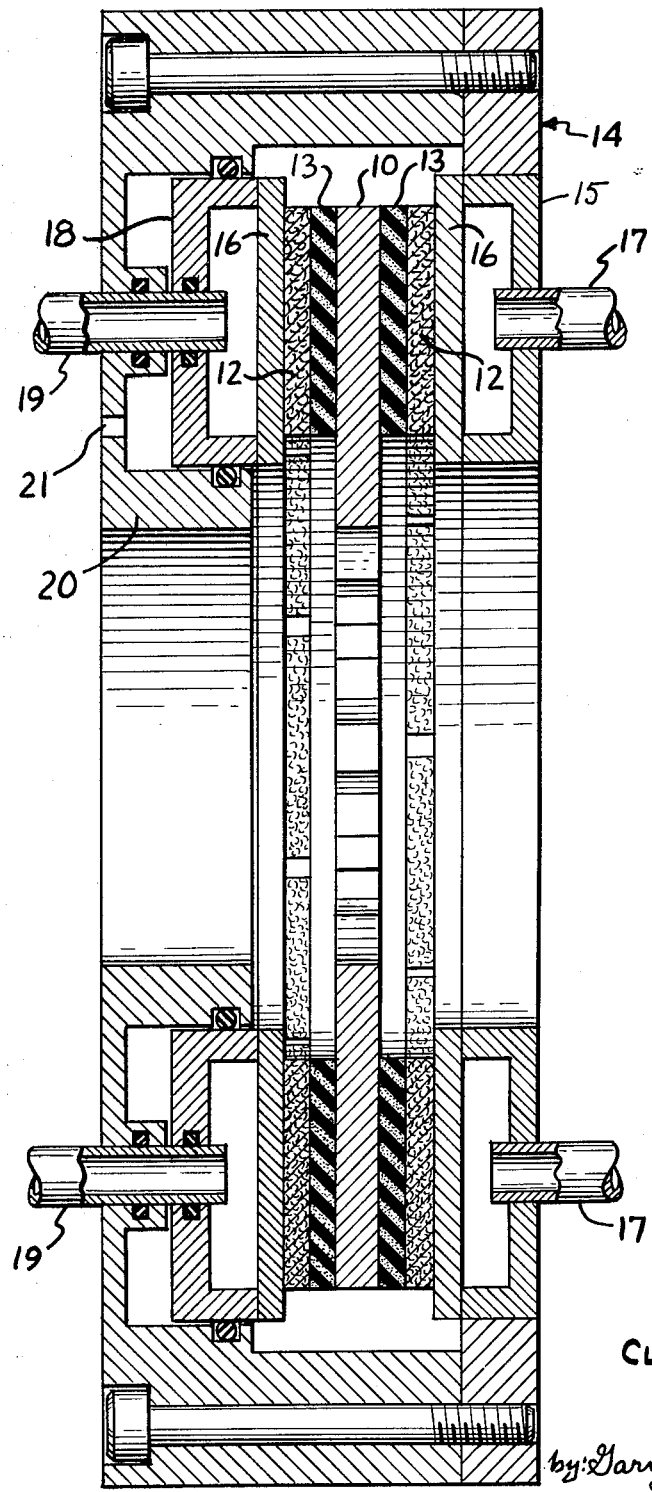
FIG. 3 is a diagrammatic sectional view of a braking system employing the present invention.

Referring to FIG. 3 of the drawings, reference numeral 14 indicates a liquid-cooled brake system or clutch housing wherein there is mounted the annular friction disc unit of the present invention comprising the steel core or backing plate 10 carrying segments of nonmetallic friction composition lining material 12 secured to the plate 10 by the interposed layers of resilient material 13. This friction element is operatively mounted between the annular liquid-cooled copper mating elements 16—16. One of these elements is integrally secured to the fixed annular metallic shoe or chamber component 15 and is adapted to be cooled through cooling liquid inlet 17. The opposed copper mating element 16 is carried by the annular metallic shoe or chamber component 18 supplied with cooling liquid through the inlet 19, and is slidably mounted in the annular cylinder component 20 wherein it is adapted to be actuated by fluid such as air or liquid introduced through the inlet 21 for applying the load.

Although we have shown and described the preferred embodiment of our invention, it will be understood that changes may be made in the details thereof without departing from its broader scope as comprehended by the following claims.

We claim:

1. Friction mechanism comprising a high heat-conductive, liquid-coolable metal friction facing composed principally of copper, and an annular friction disc adapted for operative slidable surface engagement therewith and at loads of from 1 to 25 pounds per square inch and whereby torque is regulated by said pressure, said friction disc comprising an annular metal supporting plate, annularly disposed radially divided friction lining comprised of fiber-reinforced, heat-hardened organic binder carried on at least one face of said supporting plate, and a body of cellular, resilient rubber material secured to and between said supporting plate and said friction lining and at least coextensive with the latter said body of rubber material being progressively deformable under said loads and deformable at said maximum load.

2. A slip clutch friction element adapted for operative rotative slidable surface engagement for protracted periods with a liquid cooled metal mating element composed principally of copper at application pressures below 25 pounds per square inch and whereby torque is regulated by said pressure, said friction element comprising an annular metal supporting plate, annularly disposed friction lining material composed of a plurality of circumferentially spaced segments each comprised of fiber-reinforced, heat hardened organic binder carried on at least one face of said supporting disc, and a body of cellular, resilient rubber material adhesively secured fully to and between the adjacent faces of said supporting disc and said friction lining, said resilient body being progressively deformable under loads of from about 1 and up to about 25 pounds per square inch.

References Cited by the Examiner

UNITED STATES PATENTS

| 1,341,673 | 6/1920 | Repony | 192—107 |
| 1,964,672 | 6/1934 | Ogren | 192—107 |
| 2,097,710 | 11/1937 | Whitelaw et al. | 192—107 X |
| 2,196,570 | 4/1940 | Walters | 192—107 |
| 2,214,762 | 9/1940 | Eksergiam | 192—109 |
| 2,253,316 | 8/1941 | Armitage | 192—107 |
| 2,852,118 | 9/1958 | La Croix et al. | 192—113.2 |
| 2,940,556 | 6/1960 | Jensen et al. | 192—113.2 X |

FOREIGN PATENTS

| 656,167 | 6/1949 | Great Britain. |

DON A. WAITE, *Primary Examiner.*

THOMAS J. HICKEY, ROBERT C. RIORDON,
*Examiners.*